(12) United States Patent
Lee et al.

(10) Patent No.: US 7,639,313 B2
(45) Date of Patent: Dec. 29, 2009

(54) ARRAY SUBSTRATE WITH SWITCHING DEVICE AND STORAGE ELECTRODE PART FORMED OF A COMMON LINE AND BLOCKING COMMON ELECTRODE ON THE SAME PLANE AND HAVING AN OBLIQUE SIDE PARALLEL WITH TRANSMISSION AXIS OF POLARIZING PLATE

(75) Inventors: Chang-Hun Lee, Yongin-si (KR); Hak-Sun Chang, Yongin-si (KR); So-Youn Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 592 days.

(21) Appl. No.: 11/252,638

(22) Filed: Oct. 18, 2005

(65) Prior Publication Data
US 2006/0232720 A1    Oct. 19, 2006

(30) Foreign Application Priority Data
Apr. 19, 2005   (KR)   .................. 10-2005-0032412

(51) Int. Cl.
*G02F 1/1343* (2006.01)

(52) U.S. Cl. .......................................... 349/38; 349/39
(58) Field of Classification Search ................. 349/38, 349/39
See application file for complete search history.

(56) References Cited

U.S. PATENT DOCUMENTS

| | | | |
|---|---|---|---|
| 6,819,385 B2* | 11/2004 | Lu | 349/144 |
| 2001/0055074 A1* | 12/2001 | Komatsu | 349/38 |
| 2003/0123010 A1* | 7/2003 | Lee | 349/141 |
| 2005/0088578 A1* | 4/2005 | Lee et al. | 349/38 |

* cited by examiner

*Primary Examiner*—John Heyman
(74) *Attorney, Agent, or Firm*—F. Chau & Associates, LLC (57) ABSTRACT

An array substrate includes a switching device, a pixel electrode, an alignment layer and a storage electrode part. The switching device is formed in a pixel area defined by gate lines and data lines. The pixel electrode is formed in the pixel area and electrically connected to the switching device. The alignment layer is formed on the pixel electrode and rubbed in a predetermined alignment direction. The storage electrode part is formed in an area adjacent to the switching device. The storage electrode part includes at least one side having an angle of about forty degrees to about fifty degrees with respect to the alignment direction. The array substrate improves display quality of the liquid crystal display panel.

19 Claims, 11 Drawing Sheets

ARRAY SUBSTRATE WITH SWITCHING DEVICE AND STORAGE ELECTRODE PART FORMED OF A COMMON LINE AND BLOCKING COMMON ELECTRODE ON THE SAME PLANE AND HAVING AN OBLIQUE SIDE PARALLEL WITH TRANSMISSION AXIS OF POLARIZING PLATE

CROSS-REFERENCE TO RELATED APPLICATION

This application claims priority from Korean Patent Application No. 2005-32412 filed on Apr. 19, 2005, the contents of which are herein incorporated by reference in their entirety.

BACKGROUND OF THE INVENTION

1. Technical Field

The present disclosure relates to an array substrate, a method of manufacturing the same and a liquid crystal display panel having the same. More particularly, the present disclosure relates to an array substrate having an improved display quality, a method of manufacturing the array substrate and a liquid crystal display panel having the array substrate.

2. Discussion of the Related Art

A liquid crystal display apparatus may be operated in an optical compensated birefringence (OCB) mode to improve a response speed and a viewing angle.

The liquid crystal display apparatus operated in the OCB mode has two electrodes, a liquid crystal material layer and two alignment layers. The two electrodes are formed on two substrates, respectively, so that a vertical electric field is formed between the two substrates. The liquid crystal material layer includes liquid crystal molecules injected into a space between the two substrates. The two alignment layers are formed on the two substrates, respectively, so that the liquid crystal molecules are aligned in a direction substantially in parallel with a plane of the substrate.

In the OCB mode, an alignment of the liquid crystal molecules has a symmetrical structure with respect to an imaginary central surface between the two substrates. The alignment of the liquid crystal molecules is gradually varied from a horizontal alignment to a vertical alignment between the substrates and the imaginary central surface. Therefore, the liquid crystal display apparatus operated in the OCB mode has a wide viewing angle. The liquid crystal display apparatus has horizontal alignment layers that are rubbed in a same direction, thereby obtaining a bend alignment in response to a high voltage during an initial time. Also, in the OCB mode, the liquid crystal molecules are tilted in a same direction during a driving time, so that the liquid crystal display apparatus operated in the OCB mode has a quick response speed as well as a wide viewing angle.

However, in the liquid crystal display apparatus having a bend alignment, the bend alignment of the liquid crystal molecules is misaligned in a portion of the pixel in which the alignment of the pixel is started.

Particularly, the bend alignment is misaligned at a step difference portion of the storage common line that is formed in a direction substantially in parallel with an alignment direction of the liquid crystal molecules. Also, an electric field has a different direction from the bend alignment at an edge of the pixel electrode that is electrically isolated from a pixel electrode of an adjacent pixel, thereby misaligning the bend alignment.

When a white gray scale voltage is lower than a critical voltage Vc such that the bend alignment of the liquid crystal layer starts to misalign, the bend alignment starts to misalign at a portion of the pixel in which the switching device is formed. Therefore, a light leakage phenomenon and a color distortion phenomenon, caused by misalignment of the bend alignment, occur.

SUMMARY OF THE INVENTION

The present disclosure provides an array substrate having an improved display quality, a method for manufacturing the array substrate, and a liquid crystal display panel having the array substrate.

An array substrate in accordance with an embodiment of the present invention includes a switching device, a pixel electrode, an alignment layer and a storage electrode part. The switching device is formed in a pixel area that is defined by gate lines and data lines. The pixel electrode is formed in the pixel area and electrically connected to the switching device. The alignment layer is formed on the pixel electrode and rubbed in a predetermined alignment direction. The storage electrode part includes at least one side having an angle of about forty degrees to about fifty degrees with respect to the alignment direction. The side is formed under the pixel electrode adjacent to the switching device.

The storage electrode part includes a side having an angle of about forty degrees to about fifty degrees with respect to the alignment direction in a clockwise direction, or having an angle of about forty degrees to about fifty degrees with respect to the alignment direction in a counter-clockwise direction.

The storage electrode part includes a common electrode pattern having a triangular shape and a common line part formed in the pixel area.

Preferably, the common line part includes at least one oblique line having an angle of about forty degrees to about fifty degrees with respect to the alignment direction.

A method of manufacturing an array substrate having an alignment layer that is rubbed in a predetermined alignment direction in accordance with another embodiment of the present invention is provided as follows. A gate line extending in a first direction, a gate electrode of a switching device and a storage electrode part including a side that has an angle of about forty degrees to about fifty degrees with respect to the alignment direction are formed on a base substrate. Then, a channel part of the switching device is formed on the gate electrode. Next, a data line extending in a second direction, a source electrode of the switching device and a drain electrode of the switching device are formed. The pixel electrode that is electrically connected to the drain electrode is formed.

The storage electrode part includes a common electrode pattern having a triangular shape and a common line part formed in the pixel area. The common line part includes at least one oblique line having an angle of about forty degrees to about fifty degrees with respect to the alignment direction.

A liquid crystal display panel in accordance with another embodiment of the present invention includes a first substrate, a liquid crystal layer and a second substrate. The liquid crystal layer is operated in an OCB mode. The second substrate is coupled to the first substrate, and the liquid crystal layer is disposed between the second substrate and first substrate. The second substrate includes a switching device, a pixel electrode and a storage electrode part. The switching device is formed in a pixel area. The pixel electrode is electrically connected to the switching device. The storage electrode part is formed under the pixel electrode adjacent to the switching device. The storage electrode part has a shape including an angle of about forty degrees to about fifty degrees with respect to an alignment direction of the liquid crystal layer.

The liquid crystal display panel further includes a first polarizing member on the first substrate and a second polarizing member under the second substrate. The first polarizing member has a first transmission axis and a first absorbing axis substantially perpendicular to the first transmission axis. The second polarizing member has a second transmission axis substantially in parallel with the first absorbing axis and a second absorbing axis substantially in parallel with the first transmission axis.

The alignment direction has an angle of about forty degrees to about fifty degrees with respect to the first transmission axis or the second transmission axis.

The storage electrode part includes a common electrode pattern that has a triangular shape including at least one side substantially in parallel with the first transmission axis. Also, the storage electrode part further includes a common line part having at least one oblique line substantially in parallel with the first transmission axis. The common line part is formed in the pixel area.

The storage electrode part includes a common electrode pattern that has a triangular shape including at least one hypotenuse or line substantially in parallel with the second transmission axis. The storage electrode part further includes a common line part having at least one oblique line substantially in parallel with the second transmission axis. The common line part is formed in the pixel area.

The array substrate prevents a light leakage phenomenon due to a step difference of the storage electrode part and color distortion caused by misalignment of a bend alignment in a portion in which the switching device is formed, thereby improving a display quality of the liquid crystal display panel.

BRIEF DESCRIPTION OF THE DRAWINGS

Preferred embodiments of the present invention can be understood in more detail from the following descriptions taken in conjunction with the accompanying drawings wherein.

DETAILED DESCRIPTION OF THE PREFERRED EMBODIMENTS

Preferred embodiments of the present invention will now be described more fully hereinafter below in more detail with reference to the accompanying drawings. in which preferred embodiments of the invention are shown. This invention may, however, be embodied in different forms and should not be construed as limited to the embodiments set forth herein.

Figure 1:
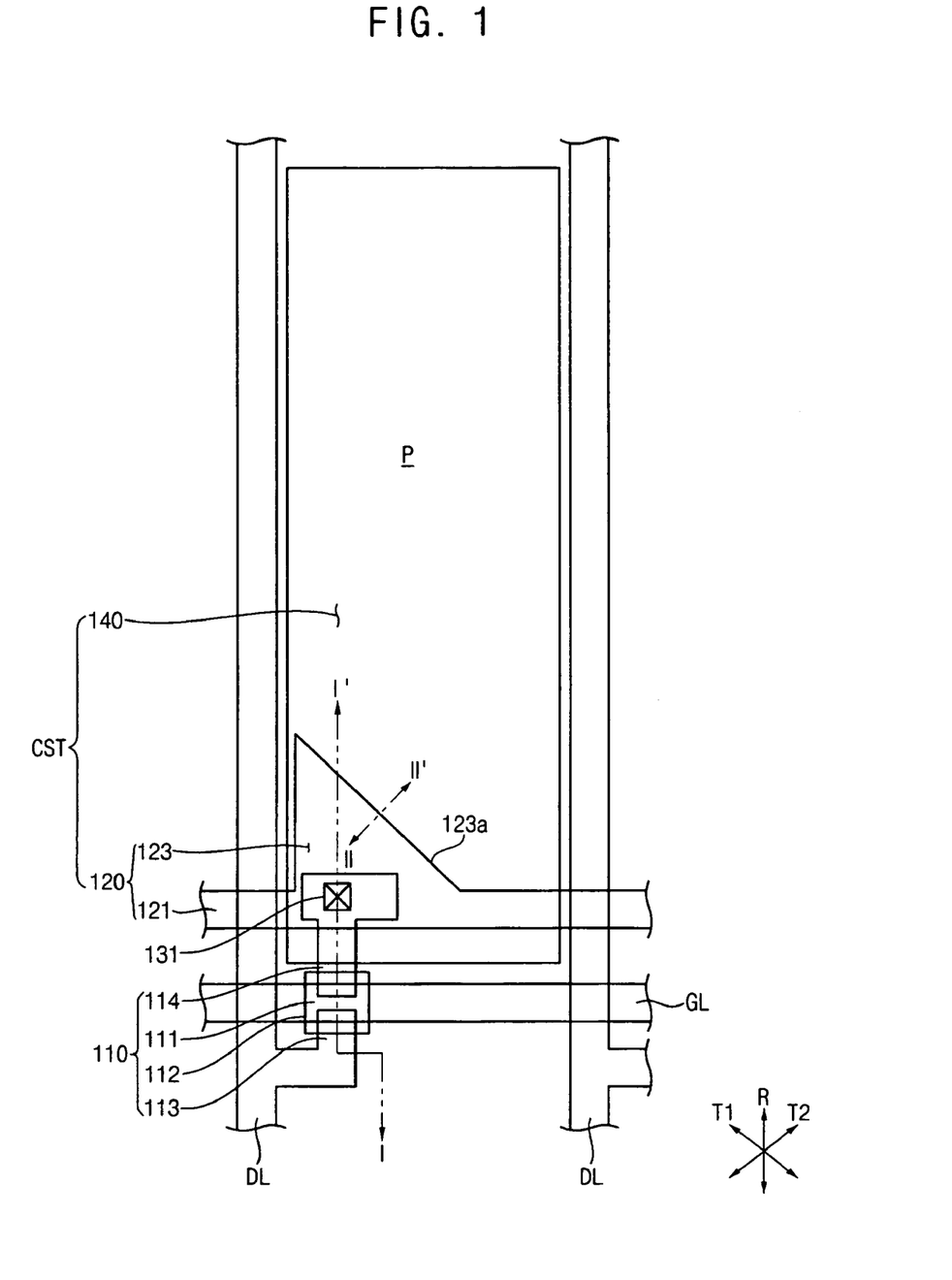
FIG. 1 is a plan view showing an array substrate of a liquid crystal display apparatus operated in an OCB mode according to an exemplary embodiment of the present invention.

FIG. 1 is a plan view showing an array substrate of a liquid crystal display apparatus operated in an OCB mode according to an exemplary embodiment of the present invention.

Referring to FIG. 1, an array substrate includes a plurality of gate lines GL, a plurality of data lines DL and a plurality of pixel portions P that are defined by the gate lines GL and the data lines DL. In the present embodiment, the plurality of pixel portions P have the same function and structure, so that one pixel portion may be described in detail as an example of the plurality of pixel portions.

Each of the pixel portions P includes a switching device 110, a storage capacitor CST and a pixel electrode 140.

The switching device 110 has a gate electrode 111 electrically connected to the gate line GL, a source electrode 113 electrically connected to the data line DL and a drain electrode 114 electrically connected to the pixel electrode 140. A channel part 112 is disposed between the gate electrode 111 and the source electrode 113 and between the gate electrode 111 and the drain electrode 114.

The storage capacitor CST is defined by a common electrode part 120 and the pixel electrode 140.

The common electrode part 120 includes a common line 121 and a blocking common electrode 123. The common line 121 is electrically connected to the storage capacitors that are formed in the pixel portions P. The blocking common electrode 123 is extended from the common line 121 such that the blocking common electrode 123 partially overlaps with an area of the pixel electrode 140. The area is adjacent to the switching device 110. Particularly, the area is adjacent to the channel part 112 of the switching device 110.

The blocking common electrode 123 has a right triangular shape and is formed at a corner of the pixel electrode 140. A hypotenuse 123a of the blocking common electrode 123 is substantially in parallel with a transmission axis T1 of a polarizing plate. In the present embodiment, an alignment direction R of the array substrate has an angle of about forty-five degrees with respect to the transmission axis T1 of the polarizing plate. The polarizing plate is a lower polarizing plate or an upper polarizing plate. A transmission axis of the lower polarizing plate is substantially in parallel with an absorbing axis of the upper polarizing plate, and an absorbing axis of the lower polarizing plate is substantially in parallel with a transmission axis of the upper polarizing plate. The transmission axes of the lower and upper polarizing plates have an angle of about ninety degrees with respect to the absorbing axes of the lower and upper polarizing plates, respectively.

Therefore, the hypotenuse 123a of the blocking common electrode 123 is substantially in parallel with the transmission axis T1 of the polarizing plate, thereby preventing a light leakage due to misalignment of the liquid crystal molecules caused by a step difference portion of the blocking common electrode 123.

Particularly, liquid crystal molecules have a characteristic in that they lie in a direction substantially perpendicular to a longitudinal direction of the step difference portion in which the step difference of the blocking common electrode 123 is formed. When the step difference is substantially in parallel with the transmission axis T1 of the polarizing plate, the liquid crystal molecules in the step difference portion lie in an absorbing axis T2 direction substantially perpendicular to the transmission axis T1, thereby preventing the light leakage. The polarizing plate may be the upper polarizing plate or the lower polarizing plate.

The blocking common electrode 123 is formed in a peripheral area of the switching device in which a bend alignment is misaligned, thereby preventing a misalignment of the bend alignment. Therefore, the blocking common electrode 123 may prevent color from being distorted due to the misalignment of the bend alignment, and the distorted color from being displayed on a screen of a liquid crystal display apparatus. In addition, a critical voltage Vc does not need to be increased to prevent deterioration of a display quality caused by the misalignment of the bend alignment. As a result, the blocking common electrode 123 prevents reduction of transmittance caused by increasing the critical voltage Vc.

The pixel electrode 140 is defined as a first electrode of a liquid crystal capacitor and is electrically connected to the switching device 110. Therefore, the liquid crystal capacitor is operated in response to a data voltage applied to the first electrode of the liquid crystal capacitor via the switching device 110. A common electrode formed on an upper substrate or the pixel electrode is defined as a second electrode of the liquid crystal capacitor.

Figure 2:
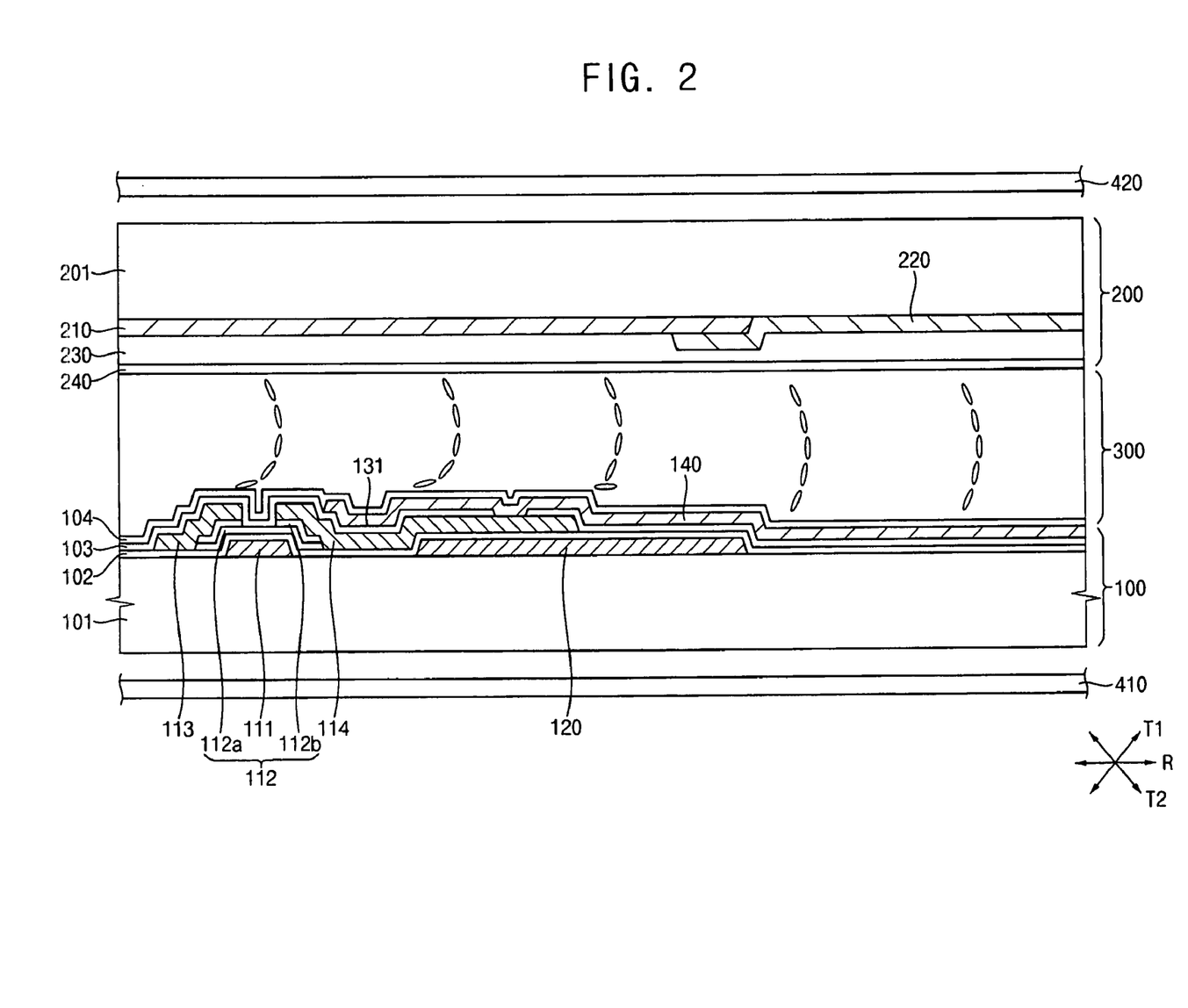
FIG. 2 is a cross-sectional view taken along a line I-I' in FIG. 1.

FIG. 2 is a cross-sectional view taken along a line I-I' in FIG. 1. FIGS. 3A to 3D are plan views illustrating a manufacturing process of the array substrate in FIG. 1.

Referring to FIGS. 1 and 2, a liquid crystal display panel operated in the OCB mode includes an array substrate 100, an opposite substrate 200, a liquid crystal layer 300 operated in the OCB mode, a first polarizing plate 410 disposed under the array substrate and a second polarizing plate 420 disposed over the opposite substrate 200.

A manufacturing process of the array substrate 100 will be described below with reference to FIGS. 2 to 3D.

Figure 3A:
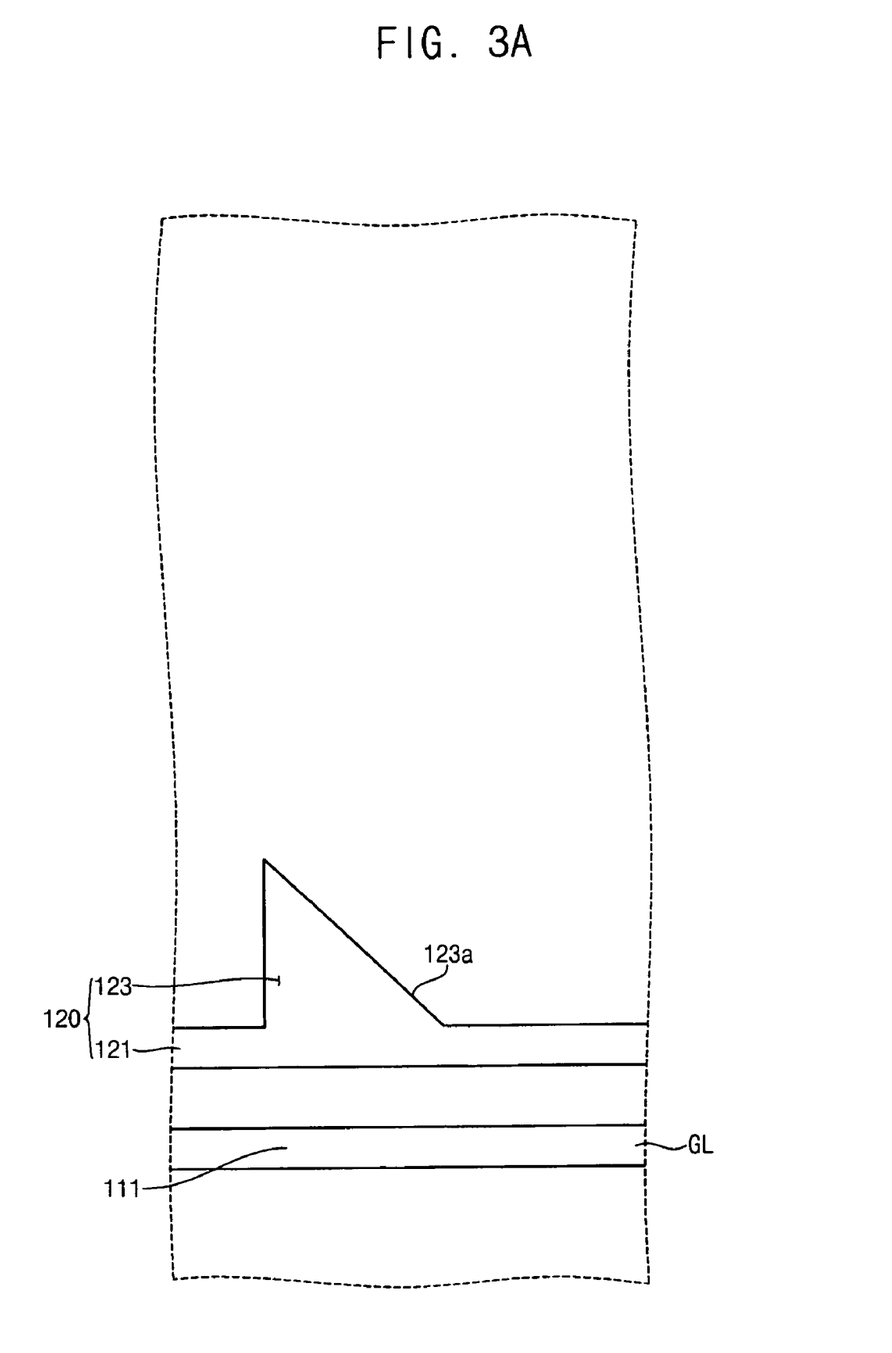
FIGS. 3A to 3D are plan views illustrating a manufacturing process of the array substrate in FIG. 1 according to an exemplary embodiment of the present invention.

Referring to FIGS. 2 and 3A, the array substrate 100 includes a transparent base substrate 101. When a gate metal layer is formed on the base substrate 101 and patterned, gate metal patterns are formed on the base substrate 101. The gate metal patterns include the gate lines GL, the gate electrode 111 of the switching device 110 and the common electrode part 120 of the storage capacitor.

The common electrode part 120 includes the common line 121 and the blocking common electrode 123, and is formed in a partial area of the pixel electrode 140 adjacent to the switching device 110.

In general, the bend alignment is misaligned in an area adjacent to the switching device 110, thereby displaying a distorted color on a screen of the liquid crystal display panel. Therefore, the common electrode part 120 covers the peripheral area of the switching device 110 in which the bend alignment is misaligned, so that a display quality of the liquid crystal display apparatus may be improved. Also, the hypotenuse 123a of the blocking common electrode 123 is substantially in parallel with a transmission axis T1 (refer to FIG. 1) of the first polarizing plate 410. The transmission axis T1 of the first polarizing plate 410 has an angle of about forty-five degrees with respect to an alignment direction R of a first alignment layer 104 in a first (e.g., clockwise) direction.

On the contrary, the hypotenuse 123a of the blocking common electrode 123 may be substantially in parallel with a transmission axis T2 (refer to FIG. 1) of the second polarizing plate 420. The transmission axis T2 of the second polarizing plate 420 has an angle of about forty-five degrees with respect to the alignment direction R of the first alignment layer 104 in a second (e.g., counter-clockwise) direction opposite the first direction.

Therefore, the liquid crystal molecules in the step difference portion of the common electrode part 120 lie in a direction substantially perpendicular to the transmission axis T1 of the first polarizing plate 410 or the transmission axis T2 of the second polarizing plate 420, thereby preventing a light leakage phenomenon.

A gate insulating layer 102 is formed on the base substrate 101 on which the gate patterns are formed. The gate insulating layer 102 includes an insulating material such as silicon nitride or silicon oxide, and has a thickness of about 4500 angstroms.

Figure 3B:
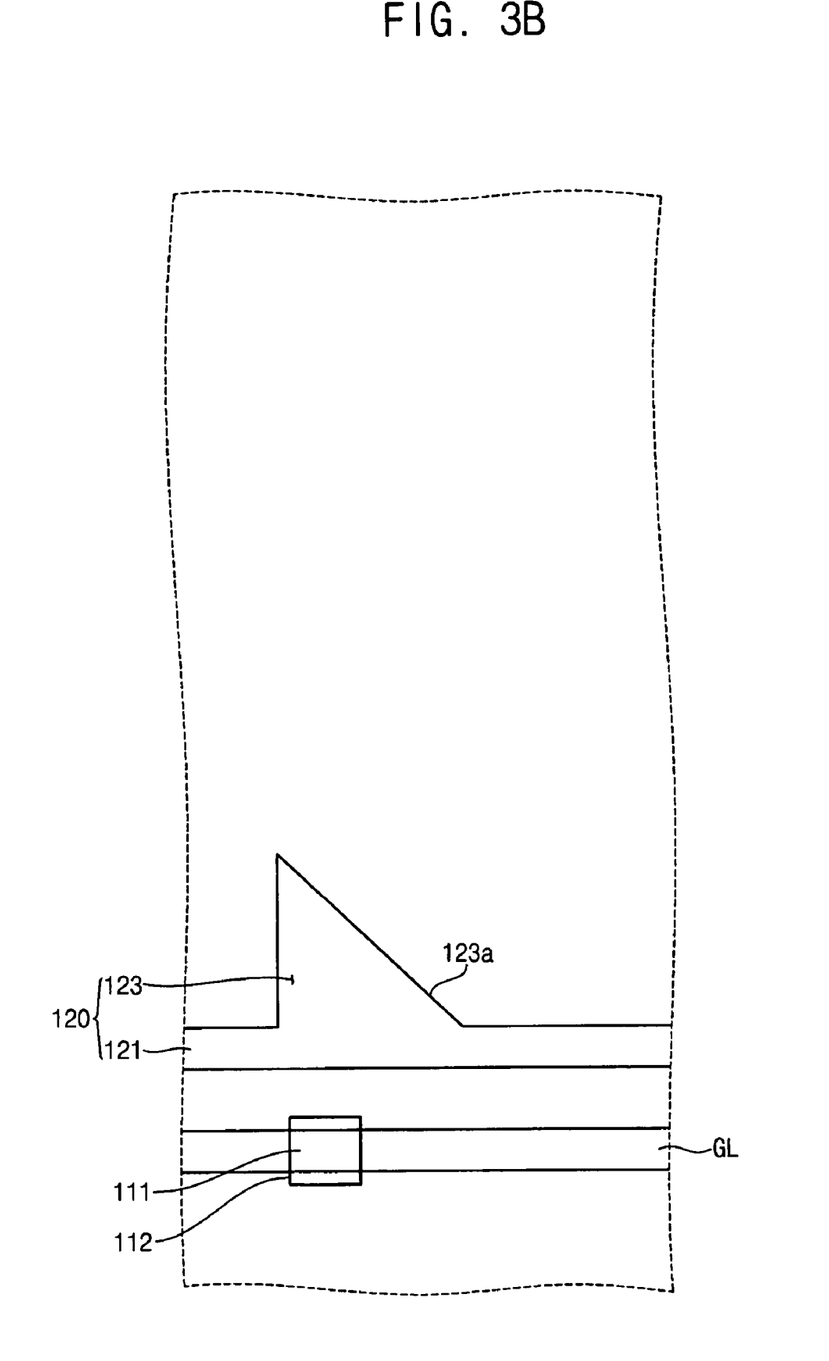

Referring to FIGS. 2 and 3B, the channel part 112 is formed on the gate insulating layer 102. The channel part 112 includes an active layer 112a and an ohmic contact layer 112b. The active layer 112a includes an amorphous silicon layer and an n+ amorphous silicon layer doped by an in-situ process. The channel part 112 is formed over the gate electrode 111 of the switching device 110.

Figure 3C:
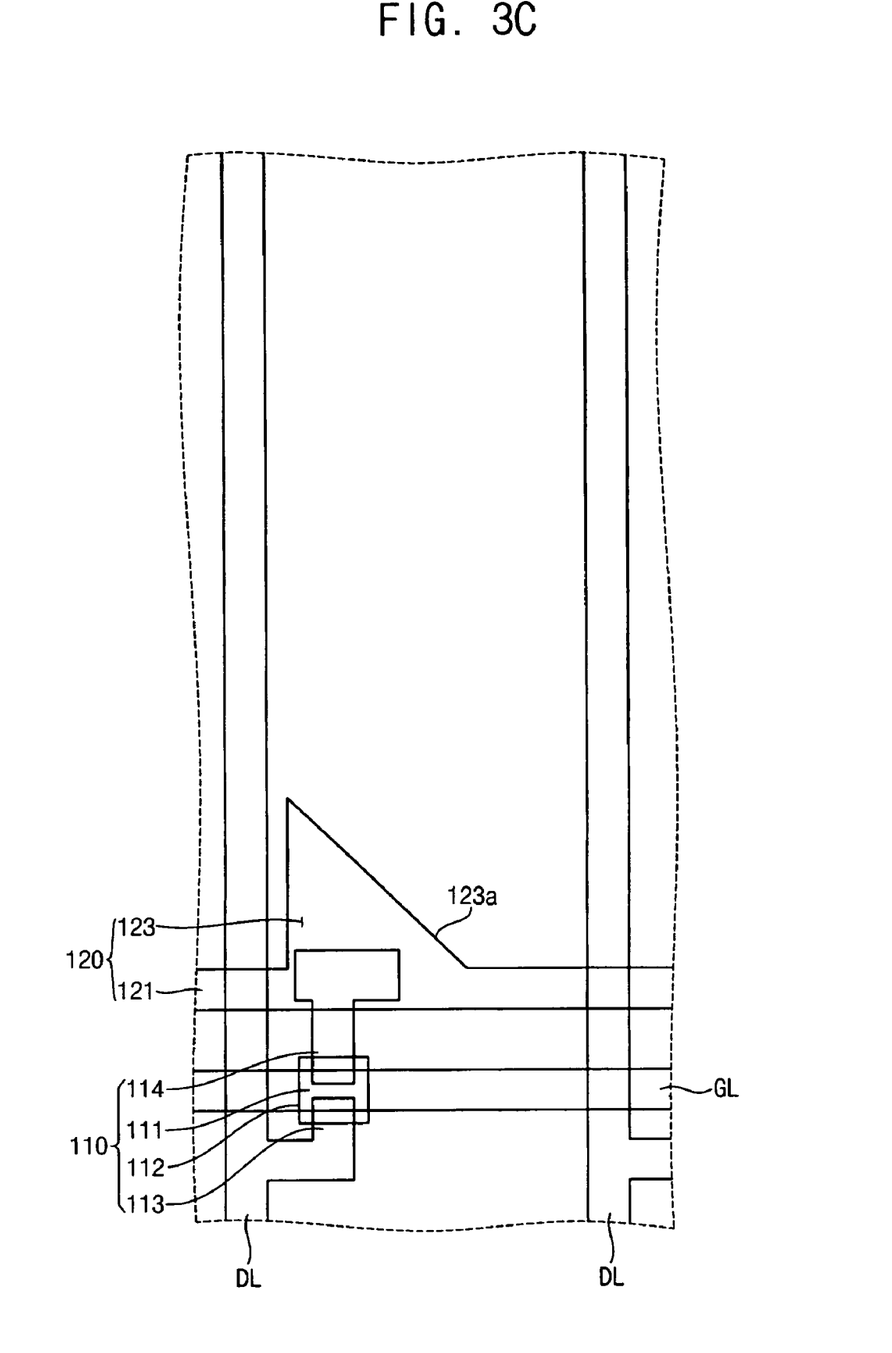

Referring to FIGS. 2 and 3C, when a data metal layer is formed on the base substrate 101 on which the channel part 112 is formed and the data metal layer is patterned, data metal patterns are formed over the base substrate 101.

The data metal patterns include the source electrode 113 of the switching device 110, the drain electrode 114 of the switching device 110 and the data lines DL.

A passivation layer 103 is formed on the base substrate 101 on which the data patterns are formed. The passivation layer 103 includes an inorganic insulating layer and has a thickness of about 4000 angstroms.

Figure 3D:
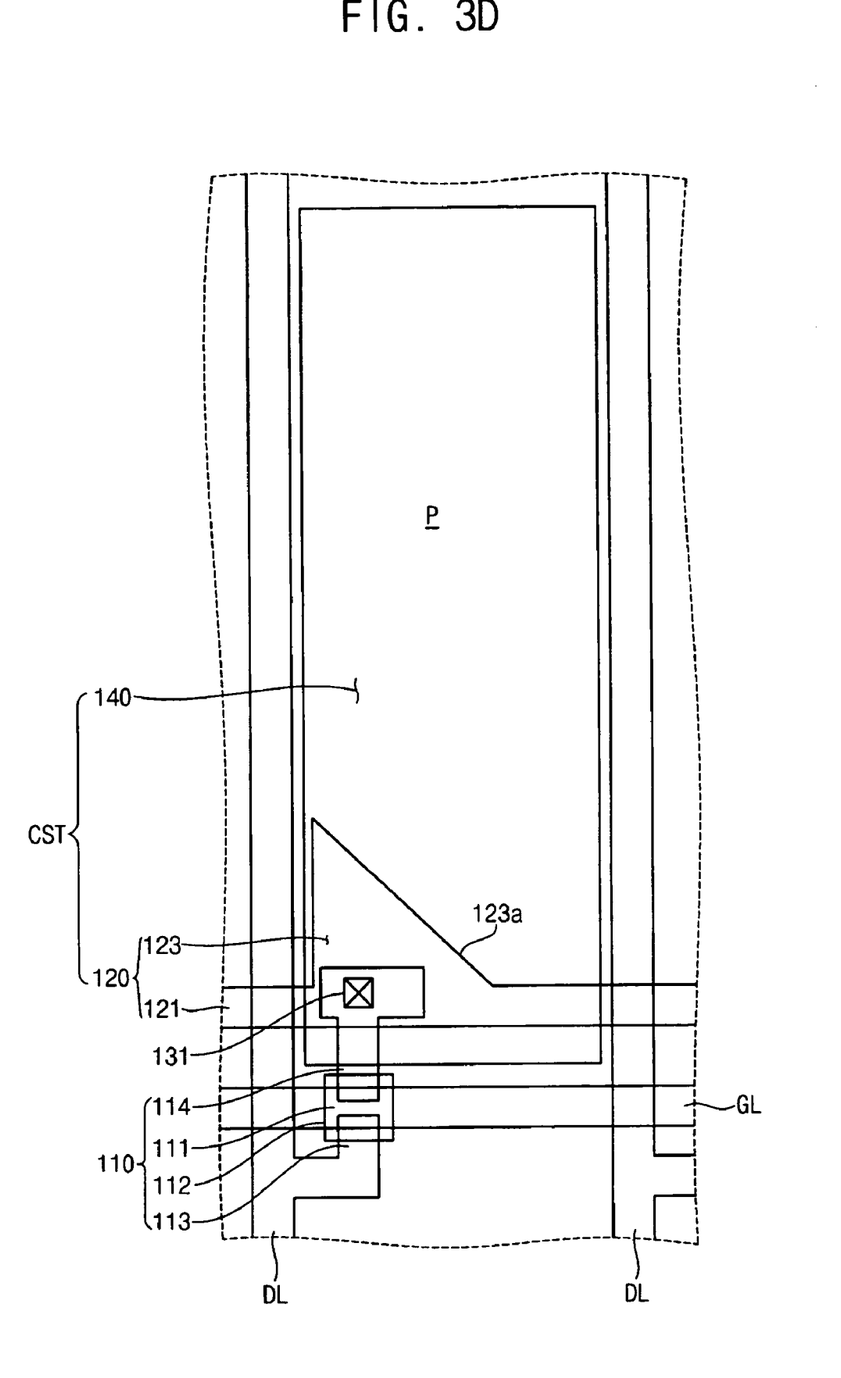

Referring to FIGS. 2 and 3D, a contact hole 131 is formed through the passivation layer 103 by a photolithography process to partially expose the drain electrode 114 through the contact hole 131.

In the present embodiment, the passivation layer 103 includes the inorganic insulating layer; however, the passivation layer 103 may include both inorganic and organic insulating layers, or only the organic insulating layer. Also, the organic insulating layer may include a color filter.

When a transparent conductive material is deposited on the base substrate 101 on which the passivation layer 103 is formed and the transparent conductive material is patterned, the pixel electrode 140 is formed over the base substrate 101. The transparent conductive material includes indium tin oxide, indium zinc oxide or indium tin zinc oxide.

The first alignment layer 104 is formed on the base substrate 101 on which the pixel electrode 140 is formed. The first alignment layer 104 is rubbed in the alignment direction R, and the first alignment layer 104 has a pre-tilt angle of about eight degrees to about ten degrees in consideration of an alignment direction of the OCB mode.

The opposite substrate 200 includes a transparent base substrate 201. When the blocking layer is formed on the base substrate 201 and patterned, blocking patterns 210 are formed on the base substrate 201 to define an inner space corresponding to the pixel portions P.

RGB color filter patterns 220 are formed in the inner space defined by the blocking patterns 210. A common electrode layer 230 is formed on the base substrate 201 on which the color filter patterns 220 are formed. Although not shown in figures, the opposite substrate 200 may further include a planarization layer so as to planarize a step difference between the blocking patterns 210 and the color filter patterns 220.

A second alignment layer 240 is formed on the common electrode layer 230. The second alignment layer 240 is rubbed in the same alignment direction R as the first alignment layer 104. The first alignment layer 104 has a pre-tilt angle of about eight degrees to about ten degrees.

The liquid crystal layer 300 is aligned such that the liquid crystal layer 300 is operated in the OCB mode. The liquid crystal layer 300 includes nematic liquid crystal molecules that are initially aligned in a splay alignment, and the nematic liquid crystal molecules are aligned in a bend alignment while a predetermined voltage is applied to the liquid crystal layer 300. Therefore, the liquid crystal layer 300 aligned in a bend alignment controls a transmittance in response to a predetermined data voltage, so that the liquid crystal display panel may display an image using the liquid crystal layer 300.

Figure 4:
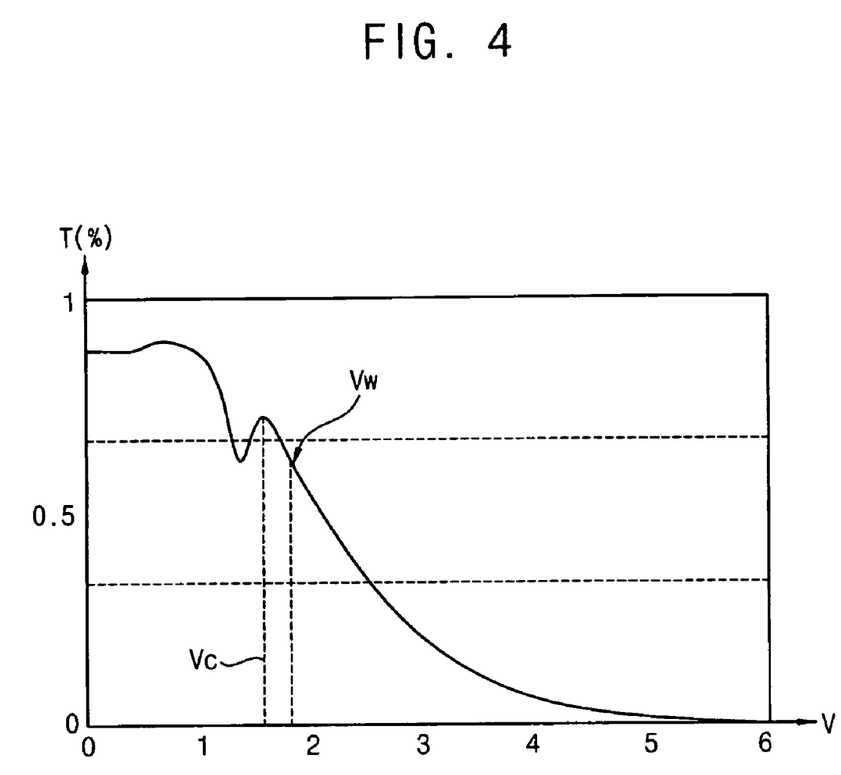
FIG. 4 is a graph showing a V-T (Voltage-Transmittance) curve in the OCB mode according to an exemplary embodiment of the present invention.

FIG. 4 is a graph showing a V-T (Voltage-Transmittance) curve in the OCB mode.

Referring to FIG. 4, the bend alignment of the liquid crystal layer starts to misalign at the critical voltage Vc. The liquid crystal display panel operated in the OCB mode has a higher white gray scale voltage Vw than the critical voltage Vc. As shown in FIG. 4, the liquid crystal display panel has a white gray scale voltage Vw of about two volts and a black gray scale voltage about six volts. The liquid crystal display panel has gray scale levels of 64, 256 or 1024 between the white and black gray scale levels. That is, gray scale voltages applied to the liquid crystal display panel are in a range from about two volts to about six volts. Therefore, since the white gray scale voltage Vw is higher than the critical voltage Vc, the liquid crystal molecules may be maintained in the bend alignment.

The first polarizing plate 410 is disposed under the array substrate 100 and has a first transmission axis T1 and a first absorbing axis T2 substantially perpendicular to the first transmission axis T1. The first transmission axis T1 has an angle of about forty-five degrees with respect to the alignment direction R.

The second polarizing plate 420 is disposed over the opposite substrate 200 and has a second transmission axis T2 and a second absorbing axis T1 substantially perpendicular to the second transmission axis T2. The second transmission axis T2 has an angle of about forty-five degrees with respect to the alignment direction R. The second transmission axis T2 is substantially in parallel with the first absorbing axis T2, and the second absorbing axis T1 is substantially in parallel with the first transmission axis T1.

Figure 5:
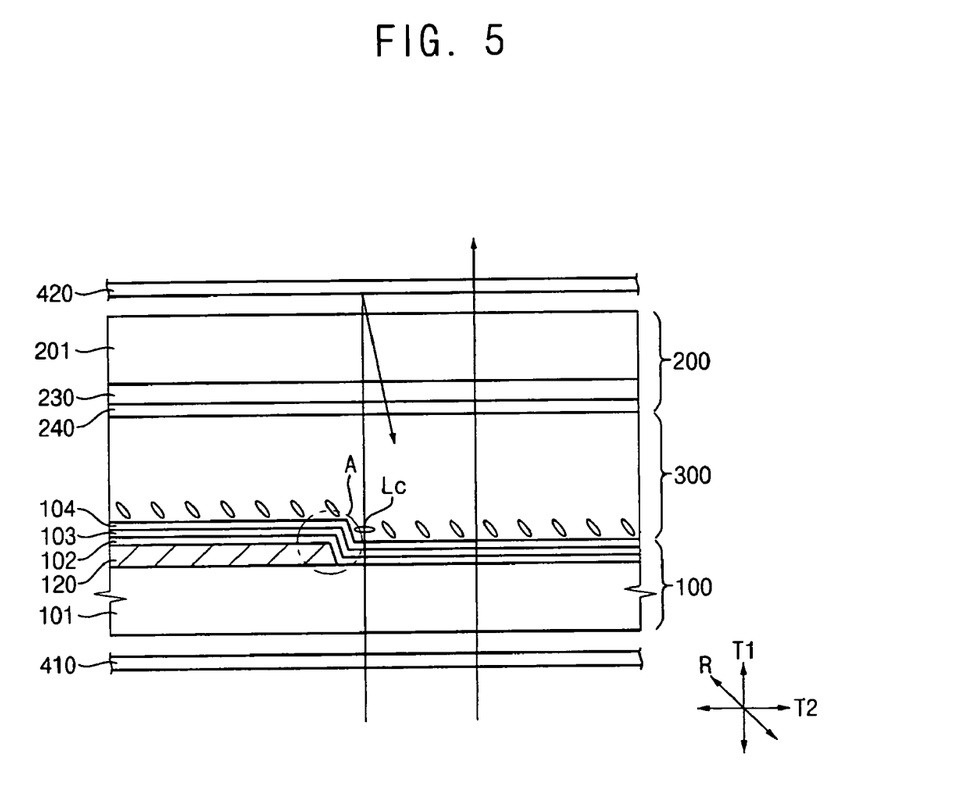
FIG. 5 is a cross-sectional view taken along a line II-II' in FIG. 1.

FIG. 5 is a cross-sectional view taken along a line II-II' in FIG. 1.

Referring to FIGS. 1 and 5, the step difference portion A is formed in the pixel portion P due to the common electrode part 120. Also, the direction of the step difference portion A is substantially in parallel with the first transmission axis T1 of the first polarizing plate 410 or the second transmission axis T2 of the second polarizing plate 420.

Referring to FIG. 5, the liquid crystal molecules Lc are aligned on a flat surface, except the liquid crystal molecules Lc in the step difference portion A are laid in a direction substantially perpendicular to the direction T1 of the step difference. That is, the liquid crystal molecules Lc that are disposed in the step difference portion A are laid in a direction substantially in parallel with the first absorbing axis T2. Alternatively, depending on the direction of the step difference portion A, the liquid crystal molecules Lc disposed in the step difference portion A can be laid in a direction substantially parallel with the second absorbing axis T1.

Therefore, light passed through the liquid crystal molecules Lc that are laid in a direction substantially in parallel to the second absorbing (first transmission) axis T1 is blocked by the second polarizing plate 420. Alternatively, light passed through liquid crystal molecules Lc that are laid in a direction substantially parallel to the first absorbing (second transmission) axis T2 is blocked by the first polarizing plate 410.

Figure 6:
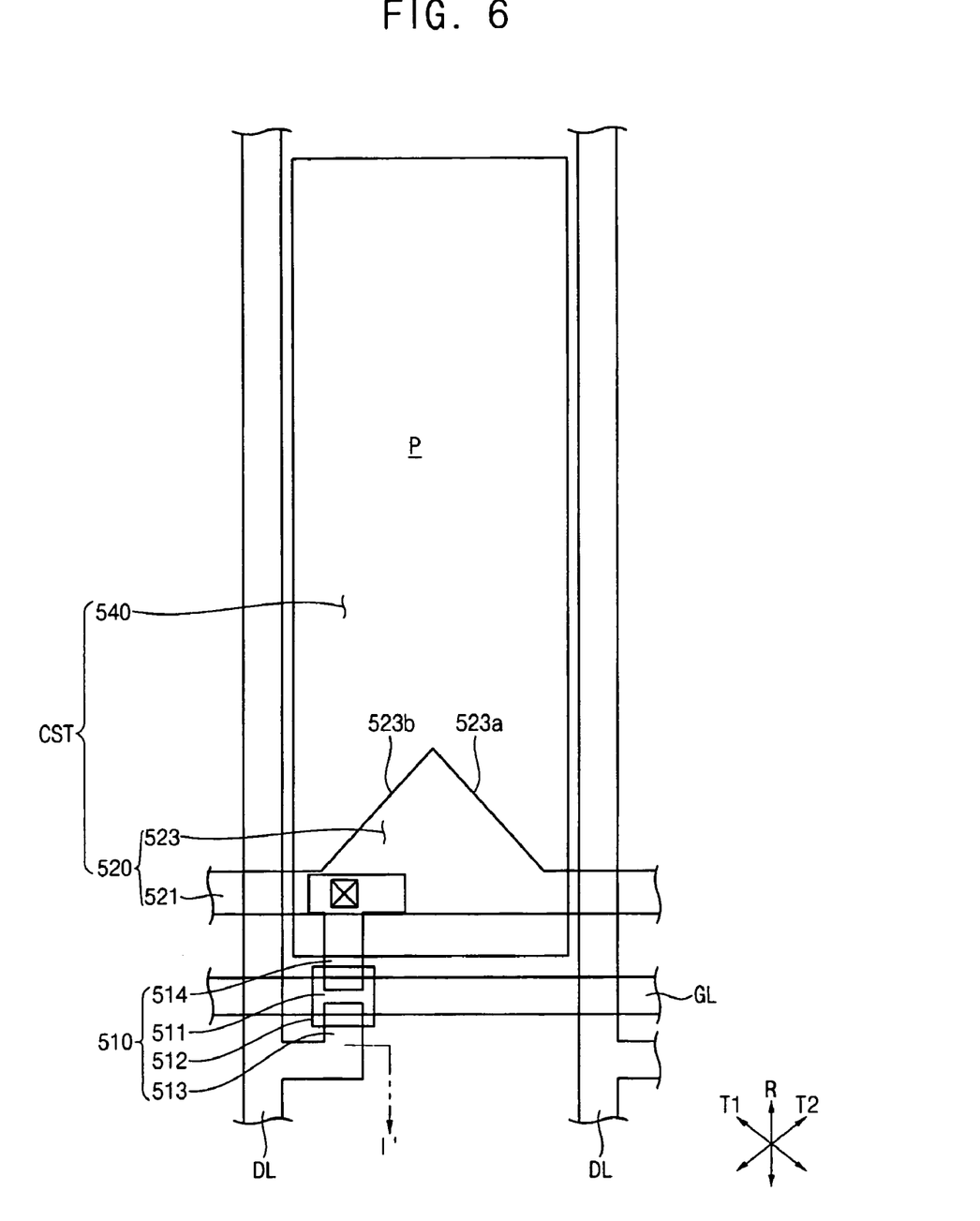
FIG. 6 is a plan view showing an array substrate of a liquid crystal display apparatus operated in an OCB mode according to another exemplary embodiment of the present invention.

FIG. 6 is a plan view showing an array substrate of a liquid crystal display apparatus operated in an OCB mode according to another exemplary embodiment of the present invention.

Referring to FIG. 6, an array substrate includes a plurality of gate lines GL, a plurality of data lines DL and a plurality of pixel portions P that are defined by the gate lines GL and the data lines DL.

Each of the pixel portions P has a switching device 510, a storage capacitor CST and a pixel electrode 540 that are substantially the same as the switching device, the storage capacitor and the pixel electrode of FIG. 1.

The switching device 510 includes a gate electrode 511 electrically connected to the gate line GL, a source electrode 513 electrically connected to the data line DL and a drain electrode 514 electrically connected to the pixel electrode 540. A channel part 512 is formed between the gate electrode 511 and the source electrode 513 and between the gate electrode 511 and the drain electrode 514.

The storage capacitor CST is defined by a common electrode part 520 and the pixel electrode 540. The common electrode part 520 includes a common line 521 and a blocking common electrode 523. The common line 521 is electrically connected to the storage capacitors that are formed in the pixel portions P. The blocking common electrode 523 is extended from the common line 521 such that the blocking common electrode 523 partially overlaps with an area of the pixel electrode 540. The blocking common electrode 523 is formed in an area adjacent to the switching device 510 of the pixel portion P Particularly, the blocking common electrode 523 is formed in an area adjacent to the channel part 512 of the switching device 510.

In the present embodiment, the blocking common electrode 523 has a triangular shape and is formed under the pixel electrode 540 adjacent to the switching device 510. A first oblique line 523a of the blocking common electrode 523 is substantially in parallel with the first transmission axis T1 of the first polarizing plate, and a second oblique line 523b of the blocking common electrode 523 is substantially in parallel with the second transmission axis T2 of the second polarizing plate. The first transmission axis T1 is substantially perpendicular to the second transmission axis T2. The first polarizing plate is a lower polarizing plate, and the second polarizing plate is an upper polarizing plate. The first and second oblique lines 523a and 523b have an angle of about forty-five degrees with respect to the alignment direction R.

That is, the first and second oblique lines 523a and 523b are substantially in parallel with the first and second transmission axes T1 and T2 (or the second and first absorbing axes T1 and T2), respectively. Therefore, the alignment of the liquid crystal molecules is misaligned due to the step difference. The misaligned liquid crystal molecules lie in a direction substantially perpendicular to the first and second transmission axes T1 and T2, thereby preventing a light leakage phenomenon in the step difference portion.

Considering that the liquid crystal molecules lie in a direction substantially perpendicular to a direction of the step difference portion, the step difference is formed in a direction substantially in parallel with the first and second transmission axes T1 and T2 of the first and second polarizing plates. Although the liquid crystal molecules are misaligned due to the step difference of the blocking common electrode 523, the liquid crystal display panel may prevent leakage of the light passed through the liquid crystal molecules, which are laid in a direction substantially in parallel with the first and second absorbing axes T2 and T1 of the first and second polarizing plates.

Also, the blocking common electrode 523 is formed in the area adjacent to the switching device, so that the blocking common electrode 523 may prevent a distortion of color caused by distortion of the bend alignment. Therefore, the liquid crystal display apparatus may prevent deterioration of a display quality of the liquid crystal display apparatus. In addition, considering that the bend alignment is misaligned, the critical voltage Vc does not need to be increased. As a result, the blocking common electrode 523 prevents a reduction of the transmittance due to the high critical voltage Vc.

The pixel electrode 540 is defined as a first electrode of a liquid crystal capacitor and is electrically connected to the switching device 510. Therefore, the liquid crystal capacitor is operated in response to a data voltage that is applied to the first electrode thereof via the switching device 510. A common electrode that is formed on an upper substrate or over the pixel electrode is defined as a second electrode of the liquid crystal capacitor.

Figure 7:
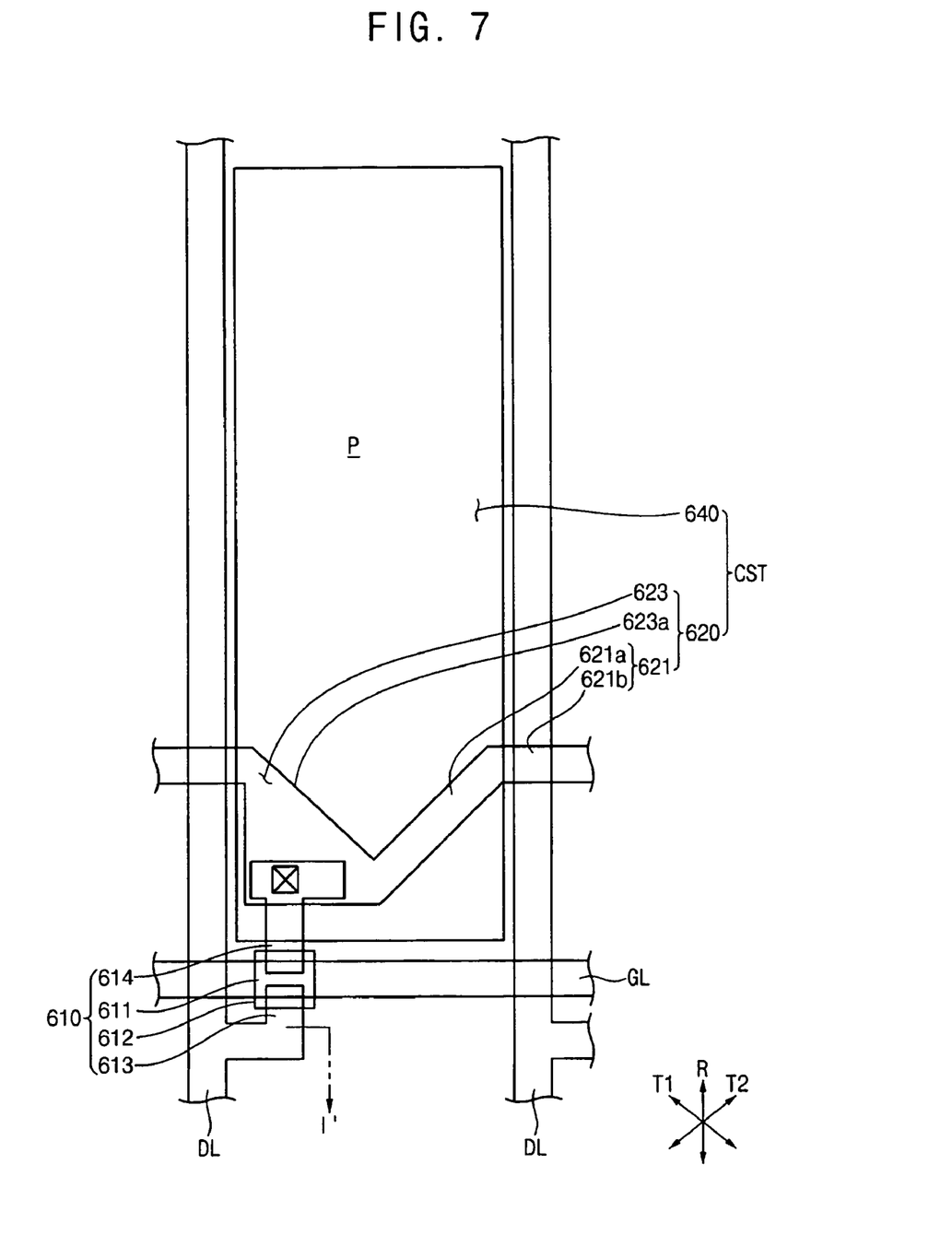
FIG. 7 is a plan view showing an array substrate of a liquid crystal display apparatus operated in an OCB mode according to another exemplary embodiment of the present invention.

FIG. 7 is a plan view showing an array substrate of a liquid crystal display apparatus operated in an OCB mode according to another exemplary embodiment of the present invention.

Referring to FIG. 7, an array substrate includes a plurality of gate lines GL, a plurality of data lines DL and a plurality of pixel portions P that are defined by the gate lines GL and the data lines DL.

Each of the pixel portions P has a switching device 610, a storage capacitor CST and a pixel electrode 640 that are substantially the same as the switching device, the storage capacitor and the pixel electrode of FIG. 1.

The switching device 610 includes a gate electrode 611 electrically connected to the gate line GL, a source electrode 613 electrically connected to the data line DL and a drain electrode 614 electrically connected to the pixel electrode 640. A channel part 612 is formed between the gate electrode 611 and the source electrode 613, and between the gate electrode 611 and the drain electrode 614.

The storage capacitor CST is defined by a common electrode part 620 and the pixel electrode 640. The common electrode part 620 includes a common line 621 and a blocking common electrode 623. The common line 621 is electrically connected to the storage capacitors that are formed in the pixel portions P. The blocking common electrode 623 is extended from the common line 621 such that the blocking common electrode 623 partially overlaps with an area of the pixel electrode 640. The blocking common electrode 623 is formed in an area adjacent to the switching device 610 of the pixel portion P. Preferably, the blocking common electrode 623 is formed in an area adjacent to the channel part 612 of the switching device 610.

The common line 621 includes a first line 621a and a second line 621b. The first line 621a is formed in the pixel portion P, and the second line 621b is electrically connected to a storage common line of a pixel portion adjacent to the pixel portion P.

The first line 621a is substantially in parallel with the absorbing axis T2 (or the transmission axis) of a polarizing plate. The polarizing plate is one of the lower or upper polarizing plates.

For example, the liquid crystal molecules disposed in the step difference portion of the first line 621a are laid in a direction of the transmission axis T1 substantially perpendicular to the absorbing axis T2, thereby preventing the light leakage phenomenon caused by the step difference portion of the first line 621a.

The blocking common electrode 623 has a right triangular shape and is formed under the pixel electrode 640 adjacent to the switching device 610. The hypotenuse 623a of the blocking common electrode 623 is substantially in parallel with the transmission axis T1 of a polarizing plate.

The liquid crystal molecules that are disposed in the step difference portion of the blocking common electrode 623 are laid in a direction substantially perpendicular to the transmission axis T1, thereby preventing a light leakage of the blocking common electrode 623 due to the step difference.

Also, the blocking common electrode 623 is formed in the area adjacent to the switching device, so that the blocking common electrode 623 may prevent a distortion of color caused by misalignment of the bend alignment. Therefore, the liquid crystal display apparatus may prevent deterioration of display quality of the liquid crystal display apparatus. In addition, considering that the bend alignment is misaligned, the critical voltage Vc does not need to be increased. As a result, the blocking common electrode 623 prevents a reduction of light transmittance due to the high critical voltage Vc.

The pixel electrode 640 is defined as a first electrode of a liquid crystal capacitor and is electrically connected to the switching device 610. Therefore, the liquid crystal capacitor is operated in response to a data voltage that is applied to the first electrode thereof via the switching device 610. A common electrode that is formed on an upper substrate or over the pixel electrode is defined as a second electrode of the liquid crystal capacitor.

Figure 8:
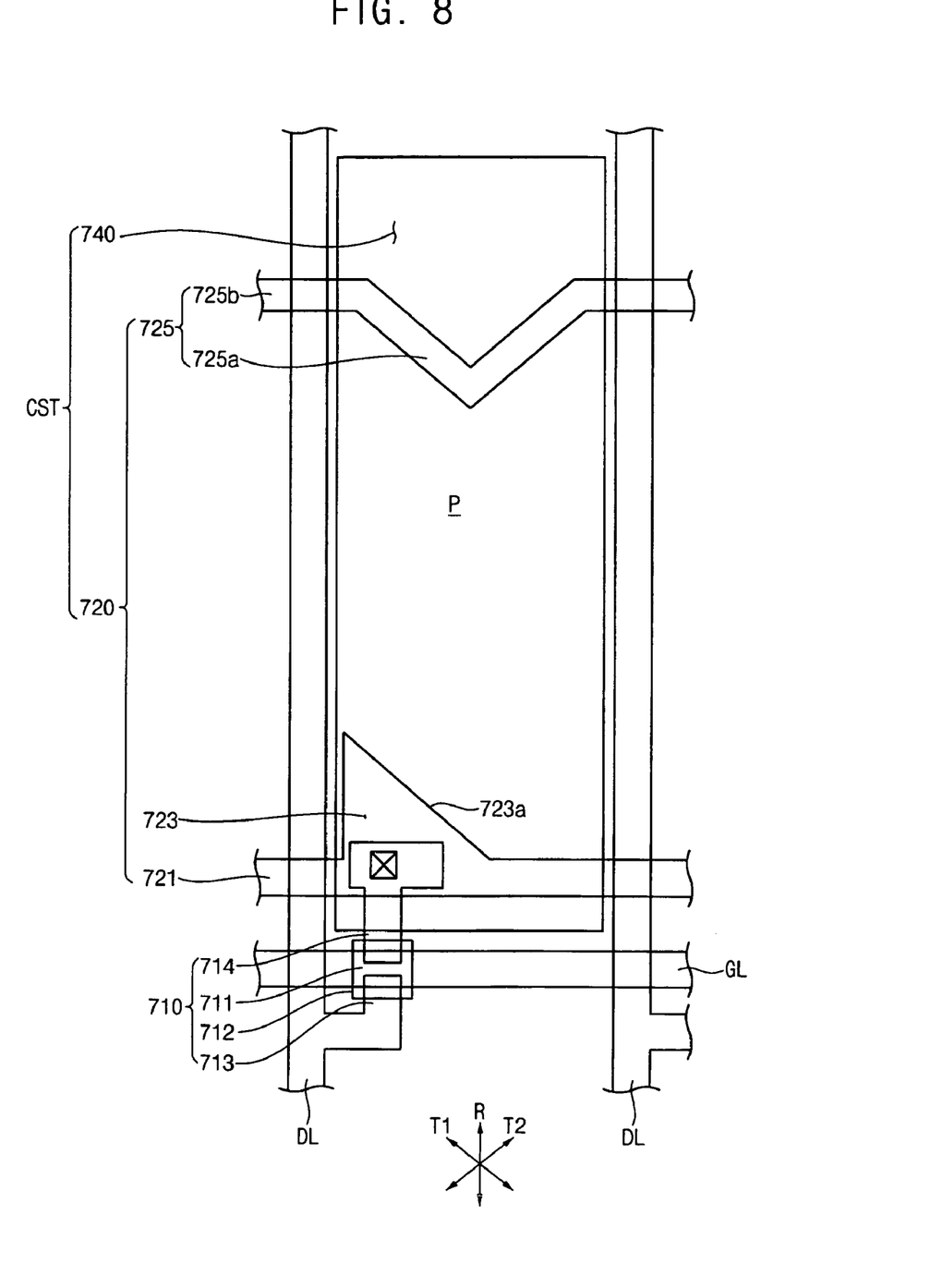
FIG. 8 is a plan view showing an array substrate of a liquid crystal display apparatus operated in an OCB mode according to another exemplary embodiment of the present invention.

FIG. 8 is a plan view showing an array substrate of a liquid crystal display apparatus operated in an OCB mode according to another exemplary embodiment of the present invention.

Referring to FIG. 8, an array substrate includes a plurality of gate lines GL, a plurality of data lines DL and a plurality of pixel portions P that are defined by the gate lines GL and the data lines DL.

Each of the pixel portions P has a switching device 710, a storage capacitor CST and a pixel electrode 740 that are substantially the same as the switching device, the storage capacitor and the pixel electrode of FIG. 1.

The switching device 710 includes a gate electrode 711 electrically connected to the gate line GL, a source electrode 713 electrically connected to the data line DL and a drain electrode 714 electrically connected to the pixel electrode 740. A channel part 712 is formed between the gate electrode 711 and the source electrode 713, and between the gate electrode 711 and the drain electrode 714.

The storage capacitor CST is defined by a common electrode part 720 and the pixel electrode 740.

The common electrode part 720 includes a first common line 721, a blocking common electrode 723 and a second common line 725.

The first common line 721 is electrically connected to the blocking common electrode 723 and a common line of an adjacent pixel portion.

The blocking common electrode 723 is extended from the first common line 721 such that the blocking common electrode 723 partially overlaps with an area of the pixel electrode 740. The blocking common electrode 723 is formed in an area adjacent to the switching device 710 of the pixel portion P.

Preferably, the blocking common electrode 723 is formed in an area adjacent to the channel part 712 of the switching device 710.

The blocking common electrode 723 has a right triangular shape, and the hypotenuse 723a of the blocking common electrode 723 has an angle of about forty-five degrees with respect to the alignment direction R. The hypotenuse 723a of the blocking common electrode 723 is substantially in parallel with the transmission axis T1 of a polarizing plate.

The liquid crystal molecules that are disposed in the step difference portion of the blocking common electrode 723 are laid in a direction T2 substantially perpendicular to the transmission axis T1, thereby preventing the light leakage phenomenon caused by the step difference portion of the blocking common electrode 723.

Also, the blocking common electrode 723 is formed in the area adjacent to the switching device 710, so that the blocking common electrode 723 may prevent a distortion of color caused by misalignment of the bend alignment. Therefore, the liquid crystal display apparatus may prevent deterioration of display quality of the liquid crystal display apparatus. In addition, considering that the bend alignment is misaligned, the critical voltage Vc does not need to be increased. As a result, the blocking common electrode 723 may prevent reduction of a light transmittance due to the high critical voltage Vc.

The second common line 725 includes a first line 725a and a second line 725b. The first line 725a is formed in the pixel portion P and has a generally V-shape having two sides that are substantially in parallel with the first and second transmission axes of the first and second polarizing plates, respectively.

Therefore, the liquid crystal molecules disposed in the step difference portion of the first line 725a are laid in a direction substantially parallel to the first and second absorbing axes T2 and T1 and substantially perpendicular to the first and second transmission axes T1 and T2, thereby preventing a light leakage phenomenon due to the step difference of the first line 725a.

The second line 725b is electrically connected to a common electrode part of an adjacent pixel portion.

The pixel electrode 740 is defined as a first electrode of a liquid crystal capacitor and electrically connected to the switching device 710. Therefore, the liquid crystal capacitor is operated in response to a data voltage that is applied to the first electrode of the liquid crystal capacitor via the switching device 710. A common electrode that is formed on an upper substrate or over the pixel electrode is defined as a second electrode of the liquid crystal capacitor.

According to the above, the storage electrode part has a gradient substantially in parallel with the transmission axis or the absorbing axis of the polarizing plate, thereby preventing the light leakage phenomenon caused by the step difference of the common electrode part.

Also, the storage electrode part is formed to partially overlap with the pixel electrode adjacent to the switching device, so that the common electrode may prevent the misalignment of the bend alignment in an area adjacent to the switching device. Thus, the storage electrode part prevents the image distortion caused by misalignment of the bend alignment from being displayed on the screen, thereby improving the display quality.

Also, a critical voltage does not need to be increased to recover the bend alignment. Accordingly, the storage electrode part prevents the reduction of the transmittance caused by an increase of the critical voltage.

Although the exemplary embodiments of the present invention have been described, it is to be understood that the present invention is not limited to these exemplary embodiments, and that various changes and modifications can be made by one ordinary skilled in the art without departing from the scope or spirit of the invention. All such changes and modifications are intended to be included within the spirit and scope of the present invention as defined by the appended claims.

What is claimed is:

1. An array substrate comprising:
   a switching device in a pixel area defined by gate lines and data lines;
   a pixel electrode in the pixel area, the pixel electrode being electrically connected to the switching device;
   an alignment layer formed on the pixel electrode, the alignment layer being rubbed in a predetermined alignment direction; and
   a storage electrode part formed adjacent to the switching device and partially overlapping with the pixel portion, the storage electrode part including a first common line and a blocking common electrode, wherein the first common line and the blocking common electrode are a unitary unit formed at a same plane,
   wherein the blocking common electrode has an oblique side substantially in parallel with a transmission axis of a polarizing plate.

2. The array substrate of claim 1, wherein the transmission axis of the polarizing plate has an angle of about forty-five degrees with respect to an alignment direction of an alignment layer in a clockwise direction.

3. The array substrate of claim 1, wherein the transmission axis of the polarizing plate has an angle of about forty-five degrees with respect to an alignment direction of an alignment layer in a counter-clockwise direction.

4. The array substrate of claim 1, wherein the blocking common electrode has a triangular shape.

5. The array substrate of claim 4, wherein the storage electrode part further comprises a second common line formed in the pixel area.

6. The array substrate of claim 5, wherein the second common line comprises at least one oblique line substantially in parallel with the transmission axis of the polarizing plate.

7. A method of manufacturing an array substrate, the method comprising:
   forming a gate line on the substrate, wherein the gate line is extended in a first direction;
   forming a gate electrode extended from the gate line;
   forming a storage electrode part on the substrate, wherein the storage electrode part includes a first common line and a blocking common electrode, wherein the first common line and the blocking common electrode are a unitary unit formed at a same plane, and the blocking common electrode has an oblique side substantially in parallel with a transmission axis of a polarizing plate;
   forming a channel part on the gate electrode;
   forming a data line on the substrate, wherein the data line is extended in a second direction;
   forming a source electrode extended from the data line and forming a drain electrode spaced apart from the source electrode; and
   forming a pixel electrode electrically connected to the drain electrode.

8. The method of claim 7, wherein the transmission axis of the polarizing plate has an angle of about forty-five degrees with respect to an alignment direction of an alignment layer in a clockwise direction.

9. The method of claim 7, wherein the transmission axis of the polarizing plate has an angle of about forty-five degrees with respect to an alignment direction of an alignment layer in a counter-clockwise direction.

10. The method of claim 7, wherein the blocking common electrode has a triangular shape.

11. The method of claim 7, wherein the storage electrode part further comprises a second common line formed in the pixel area.

12. The method of claim 11, wherein the second common line comprises at least one oblique line substantially in parallel with the transmission axis of the polarizing plate.

13. A liquid crystal display panel comprising:
   a first substrate comprising:
      a switching device in a pixel area;
      a pixel electrode electrically connected to the switching device; and
      a storage electrode part formed adjacent to the switching device and partially overlapping with the pixel portion, the storage electrode part including a first common line and a blocking common electrode, wherein the first common line and the blocking common electrode are a unitary unit formed at a same plane;
   a second substrate coupled to the first substrate;
   a liquid crystal layer being formed between the first substrate and second substrate, the liquid crystal layer operated in an optically compensated birefringence mode; and
   a polarizing member disposed under the first substrate or over the second substrate,
   wherein the blocking common electrode has an oblique side substantially in parallel with a transmission axis of the polarizing member.

14. The liquid crystal display panel of claim 13, wherein the polarizing member comprising:
   a first polarizing plate formed under the first substrate, the first polarizing plate having a first transmission axis and a first absorbing axis substantially perpendicular to the first transmission axis; and
   a second polarizing plate over the second substrate, the second polarizing plate having a second transmission axis substantially parallel to the first absorbing axis and a second absorbing axis substantially parallel to the first transmission axis.

15. The liquid crystal display panel of claim 14, wherein an angle between an alignment direction of the liquid crystal layer and the first transmission axis is in a range of about forty degrees to about fifty degrees.

16. The liquid crystal display panel of claim 14, wherein the blocking common electrode has a first oblique line substantially in parallel with the first transmission axis and a second oblique line substantially in parallel with the second transmission axis of the second polarizing plate.

17. The liquid crystal display panel of claim 14, wherein the storage electrode part further comprises a second common line formed in the pixel area, the second common line including at least one oblique line substantially in parallel with at least one of the first transmission axis and the second transmission axis.

18. The liquid crystal display panel of claim 14, wherein the blocking common electrode has a triangular shape, and a hypotenuse of the triangular shape is substantially parallel to the second transmission axis.

19. The liquid crystal display panel of claim 18, wherein the storage electrode part further comprises a second common line formed in the pixel area, the second common line having at least one oblique line substantially in parallel with at least one of the first transmission axis and the second transmission axis.

* * * * *